United States Patent
Hansen

(10) Patent No.: US 9,603,349 B2
(45) Date of Patent: Mar. 28, 2017

(54) SUBMERSIBLE SHRIMP LIGHT

(71) Applicant: Henry Hansen, Oak Hill, FL (US)

(72) Inventor: Henry Hansen, Oak Hill, FL (US)

(*) Notice: Subject to any disclaimer, the term of this patent is extended or adjusted under 35 U.S.C. 154(b) by 0 days.

(21) Appl. No.: 14/837,352

(22) Filed: Aug. 27, 2015

(65) Prior Publication Data
US 2017/0055509 A1 Mar. 2, 2017

(51) Int. Cl.
| | |
|---|---|
| F21S 4/00 | (2016.01) |
| A01K 97/00 | (2006.01) |
| F21L 14/00 | (2006.01) |
| F21V 23/00 | (2015.01) |
| F21V 31/00 | (2006.01) |
| F21V 21/108 | (2006.01) |
| F21V 23/06 | (2006.01) |
| F21V 21/08 | (2006.01) |
| F21W 131/40 | (2006.01) |
| F21Y 105/00 | (2016.01) |

(52) U.S. Cl.
CPC .............. *A01K 97/00* (2013.01); *F21L 14/00* (2013.01); *F21V 21/0832* (2013.01); *F21V 21/108* (2013.01); *F21V 23/002* (2013.01); *F21V 23/06* (2013.01); *F21V 31/00* (2013.01); *F21W 2131/40* (2013.01); *F21Y 2105/001* (2013.01)

(58) Field of Classification Search
CPC .................................................... A01K 97/00
See application file for complete search history.

(56) References Cited

U.S. PATENT DOCUMENTS

| | | | | |
|---|---|---|---|---|
| 3,836,762 | A * | 9/1974 | Thomason | F21V 31/00 362/186 |
| 4,429,350 | A * | 1/1984 | Guthrie | F21L 14/00 362/109 |
| 5,689,232 | A * | 11/1997 | O'Shaughnessy | B62J 6/005 116/53 |
| 6,273,588 | B1 * | 8/2001 | Arakelian | B60Q 1/2607 362/267 |
| 7,008,081 | B2 * | 3/2006 | Lunt | F21S 8/00 362/101 |
| 7,762,685 | B1 * | 7/2010 | Beucler | F21S 2/00 362/267 |
| 2006/0176686 | A1 * | 8/2006 | McVicker | F21S 9/022 362/183 |
| 2006/0221595 | A1 * | 10/2006 | Payne | B63B 45/02 362/101 |
| 2015/0253000 | A1 * | 9/2015 | Abernethy | F21L 14/02 362/158 |

OTHER PUBLICATIONS

Optical Ocean Sales LLC webpage, Oct. 19, 2014 web archive date from WayBack Machine https://web.archive.org/web/20141019052341/http:/www.opticaloceansales.com/arms-and-clamps/.*

* cited by examiner

*Primary Examiner* — Evan Dzierzynski
(74) *Attorney, Agent, or Firm* — Jason T. Daniel, Esq.; Daniel Law Offices, P.A.

(57) ABSTRACT

A submersible shrimp light includes a central main body section having a plurality of elongated arms extending outward therefrom. Each of the elongated arms includes a lighting unit along a distal end for illuminating an area approximately 360 degrees about the central body. Bends in the arms orient the lighting units at various angles, and weights are positioned within the device along the bottom surface.

14 Claims, 5 Drawing Sheets

SUBMERSIBLE SHRIMP LIGHT

TECHNICAL FIELD

The present invention relates generally to illumination devices, and more particularly to a submersible lighting device for use in marine environments

BACKGROUND

The statements in this section merely provide background information related to the present disclosure and may not constitute prior art.

It is well known that some marine animals such as fish and shrimp, for example, are attracted to light. In most instances, shrimp are targeted during the "shrimp run" wherein they migrate from coastal tributaries to the ocean for spawning. The majority of this activity occurs at night when the shrimp are most active; therefore, anglers utilize various forms of light producing devices to attempt to attract the shrimp where they can be caught via a cast net or other such device.

The most common light producing devices utilized for this procedure include traditional flashlights, boat mounted flood lights and/or dock mounted flood lights which shine down into the water. Unfortunately, each of these devices suffer from many drawbacks including poor light output that fails to penetrate deeply into the water, and high power consumption. Moreover, as each of these devices shine light down from the surface, the light does not typically penetrate all the way to the bottom of the water where the shrimp run.

As such, it would be beneficial to provide a long lasting, portable and fully submersible lighting device that is capable of resting on the bottom surface of a waterway and illuminating shrimp from below. It would also be beneficial to provide a light source capable of producing a continuous 360° field of extremely bright light that can extend from the bottom surface of the water to the top surface, in order to allow a user to see the shrimp as they pass through the illuminated area.

SUMMARY OF THE INVENTION

The present invention is directed to a submersible shrimp light. One embodiment of the present invention can include a central main body section having a plurality of elongated arms extending outward therefrom. Each of the elongated arms can include a lighting unit along a distal end, which can function to illuminate an area approximately 360 degrees about the central body.

In one embodiment, the arms can further include bends, so as to orient the light produced by the lighting units upward from the ocean floor on which the device is designed to operate. An elongated tether can also be provided. The tether can connect to the top surface of the central body and provide power to each of the lighting units.

Another embodiment of the present invention can include a weighted element that is located within the main body. The weighted element can function to maintain the device along the ocean floor when in use. Additionally, the device can include a buoyant donut along the top surface of the main body. The donut can function to maintain the device in an upright orientation when positioned along the ocean floor.

Yet another embodiment of the present invention can include a system employing two submersible lights that are coupled together. One of the lights can be positioned along the ocean floor, and the other light can float beneath the surface.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
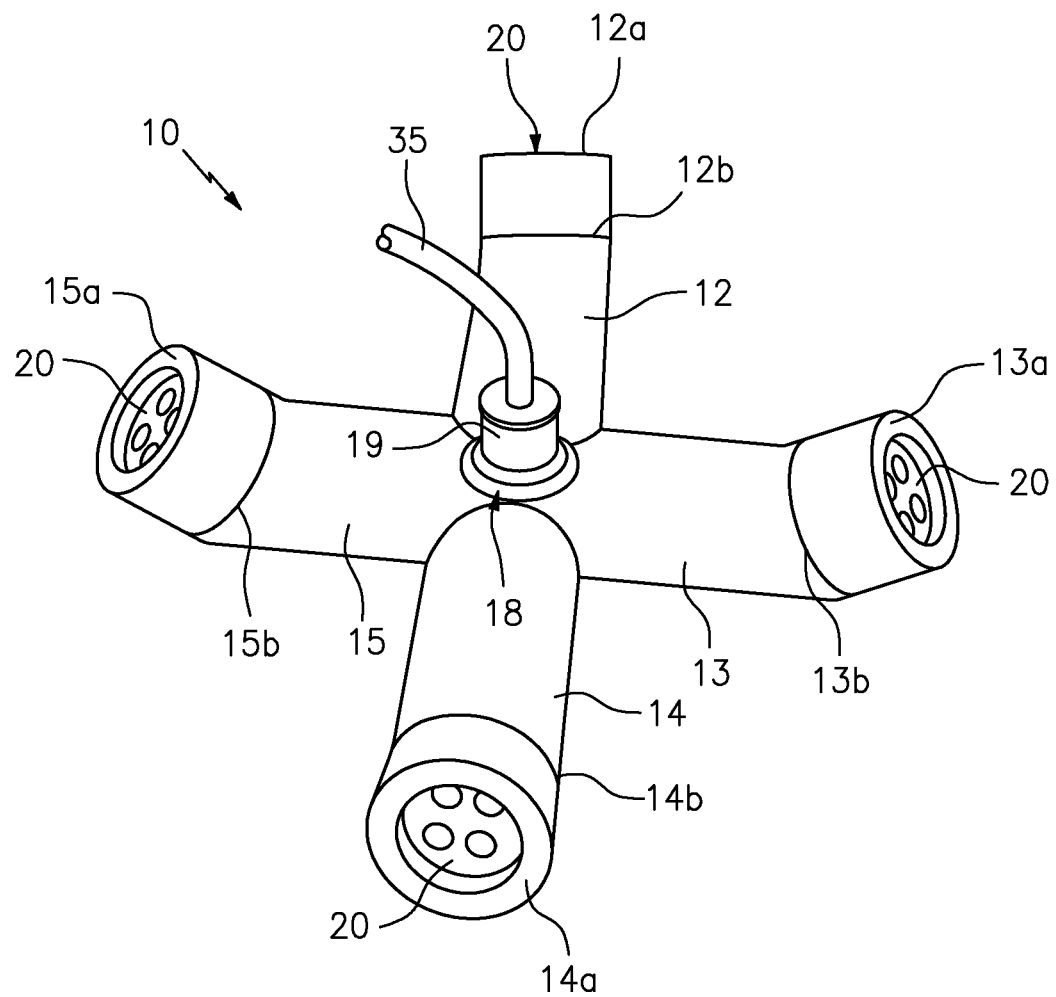
FIG. 1 is a perspective view of a submersible shrimp light that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIGS. 1-5 illustrate various embodiments of a submersible shrimp light 10 that are useful for understanding the inventive concepts disclosed herein. As shown, the light 10, can include, essentially, a main body 11 having a plurality of arms with lighting units 20 along the distal ends, and a centralized power tether 35 extending upward from the center of the main body.

As shown in FIG. 1, one embodiment of the submersible light 10 can include a central body section 11 having a plurality of elongated arms 12, 13, 14, and 15 that extend laterally outward therefrom. In the preferred embodiment, each of the elongated arms can be spaced apart by approximately 90 degrees along a single axis (i.e., lateral spacing), so as to form a generally cross shaped member. Of course, any number of other embodiments are also contemplated having more or less arms, such as three arms that are spaced apart by approximately 120 degrees, six arms that are spaced apart by approximately 60 degrees, and/or eight arms that are spaced apart by approximately 45 degrees, for example.

As shown, each of the plurality of arms 12-15 can include a distal end 12a-15a, respectively, for housing a lighting unit 20. Additionally, each of the plurality of arms can further include a bend or canted portion 12b-15b, respectively that is located adjacent to the distal end. These bends can function to orient the distal end of each arm 12a-15a vertically at an angle of approximately 45 degrees from the remainder of each arm. Of course, the bends 12b-15b are not limited to 45 degrees, as one or more of the arms can include a bend that is less than, or greater than 45 degrees. To this end, various embodiments of the device 10 are contemplated wherein each arm includes an identical bend, or wherein one or more arms include bends of different degrees.

In the preferred embodiment, the central body section 11 and each of the elongated arms 12-15 can be constructed from one or more pieces of tubular 1½" PVC material. Of course, any number of sturdy, watertight materials that resist corrosion, and are suitable for prolonged exposure to water are also contemplated. Several nonlimiting examples include stainless steel, aluminum, plastic and composite materials, for example.

Figure 2:
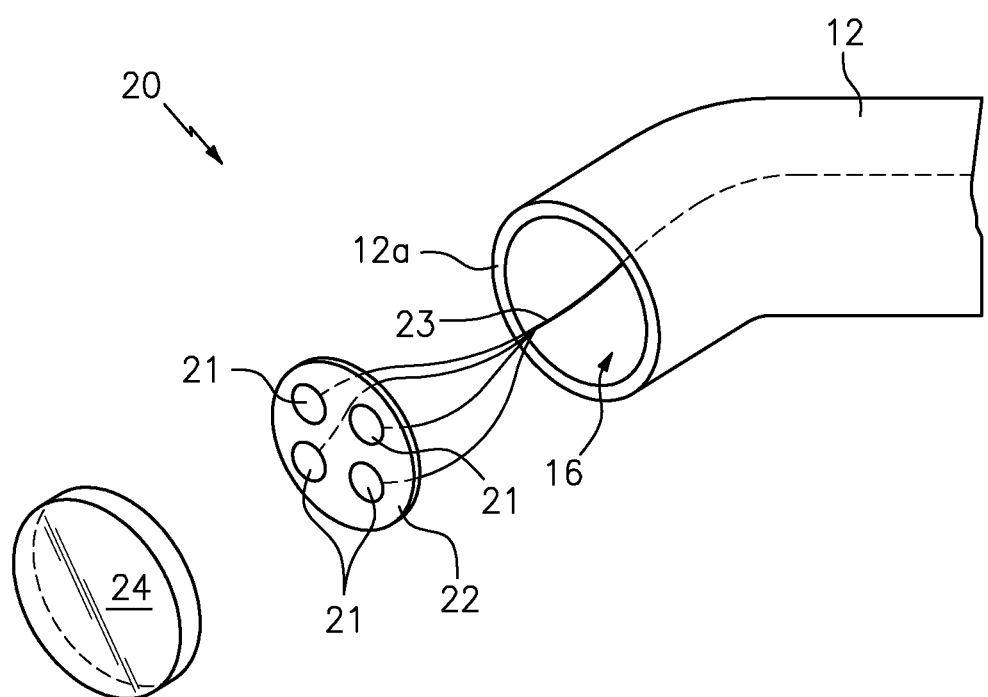
FIG. 2 is a partial cutout view of a lighting unit of the submersible shrimp light, in accordance with one embodiment of the invention.

FIG. 2 is an exploded parts view of one embodiment of a lighting unit 20. For ease of illustration, only the distal end 12a of the elongated arm 12 is shown, however the below described components and installation will be identical for each arm 12-15. As shown, each lighting unit 20 can preferably include four individual high power Light Emitting Diodes (LED) 21, producing white or green light, and that are positioned within a base material 22 such as polyethylene, for example. Each of the LED's can be arranged into a generally circular pattern so as to be housed within an aperture 16 located along the distal end of each arm 12a-15a, respectively. One example of a suitable LED light for use herein can include a 12 volt, 4 Watt MR16 LED that is commercially available from GE®. Of course, any number of other types, styles, colors and number of lights are also contemplated for use herein.

A plurality of power lines 23 can be housed within each arm 12-15, and can connect each individual LED 21 with the below described power tether 35, so as to convey the energy necessary to power each LED. A clear lens 24 can be secured along the aperture 16 at the distal end 12a, and can function to maintain a watertight seal, thereby protecting the LED's from the water outside, while allowing the light produced by each LED to pass therethrough.

By providing lighting units 20 along each end of the elongated arms 12-15, the inventor has discovered a novel method of illuminating a 360° area by utilizing a relatively small number of lights and without creating any dead spots in the illumination. To this end, by eliminating the dead spots, there is no twinkling/strobe light effect (i.e. alternating periods of darkness and illumination) which can act to frighten fish or shrimp and result in the opposite of the intended effect of the apparatus. Moreover, when utilizing the above described lighting elements, the device can light a diameter of between 25 and 30 feet in clear water.

Although described above as utilizing four individual high power LED lights within each lighting unit, this is for illustrative purposes only, as virtually any known lighting device capable of producing approximately 100 lumens in a 360° field of view can be utilized in a corresponding manner without deviating from the scope and spirit of the inventive concepts disclosed herein. Moreover, lighting of any color, shape, wavelength and intensity can also be utilized as described above.

To this end, in one embodiment, each of the lighting units 20 can include an identical number of lights that produce an identical color and intensity; however, other embodiments may be provided wherein one or more of the lighting units 20 includes a different number of lights, a different color, and/or a different intensity than another lighting unit within the same device.

Figure 3:
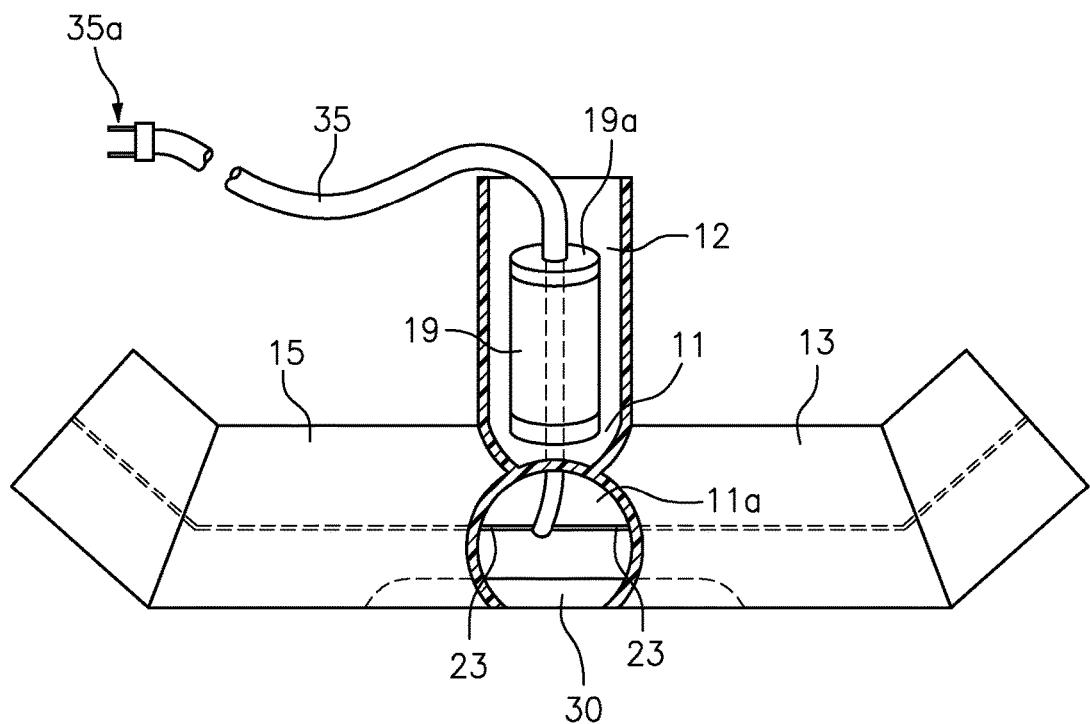
FIG. 3 is a cross sectional side view of the submersible shrimp light, in accordance with one embodiment of the invention.

FIG. 3 is a cross sectional cutout view of the device 10, wherein the elongated arm 14 is removed to illustrate the hollow interior section 11a of the central body 11. As shown, a weight 30, can be disposed along the bottom surface of the central body and/or the plurality of arms 12-15. The weight can range between approximately two and six pounds, for example, and can be secured in place via adhesives. Such a feature serves to position the device securely along the bottom surface of a saltwater environment with a sufficient force to prevent movement in the surf. The weight also functions in conjunction with the below described donut 18 to maintain the device in an upright configuration when underwater.

An elongated waterproof electrical power tether 35 can extend through the central body 11 to connect with, and provide power to, each of the power lines 23 of the lighting units 20. The power tether 35 can extend through an opening at the distal end of a connector 19 located on the top surface of the central body 11 and can be sealed with a waterproof cover 19a.

In the preferred embodiment, the power tether, can include a length of between 25 and 50 feet, for example, and can further include an electrical connector/plug 35a along one end for engaging a power source such as a DC battery, or an AC outlet for example. As would be known to one of skill in the art, any known power supply device, power line and power cord arrangement can be utilized so long as the resulting embodiment is completely waterproof and submersible.

In the preferred embodiment, a buoyant donut 18 can encircle a portion of the connector 19 (See FIG. 1). The donut 18 can be constructed from a lightweight material such as styrofoam or cork, for example, and can be adhered to the connector 19 and/or the top surface of the central body 11 via an adhesive. The donut can function in conjunction with the weight 30 to ensure the device maintains an upright orientation when underwater.

Another aspect is directed to a method for making a submersible shrimp light 10. The method can include coupling a plurality of arms 12-15 to a medial body 11; coupling a connector 19 and associated cable 35 to the medial body; forming a weighted mass within the medial body 11, and coupling a plurality of lighting units 20 along the distal ends of the plurality of arms 12-15.

Figure 4:
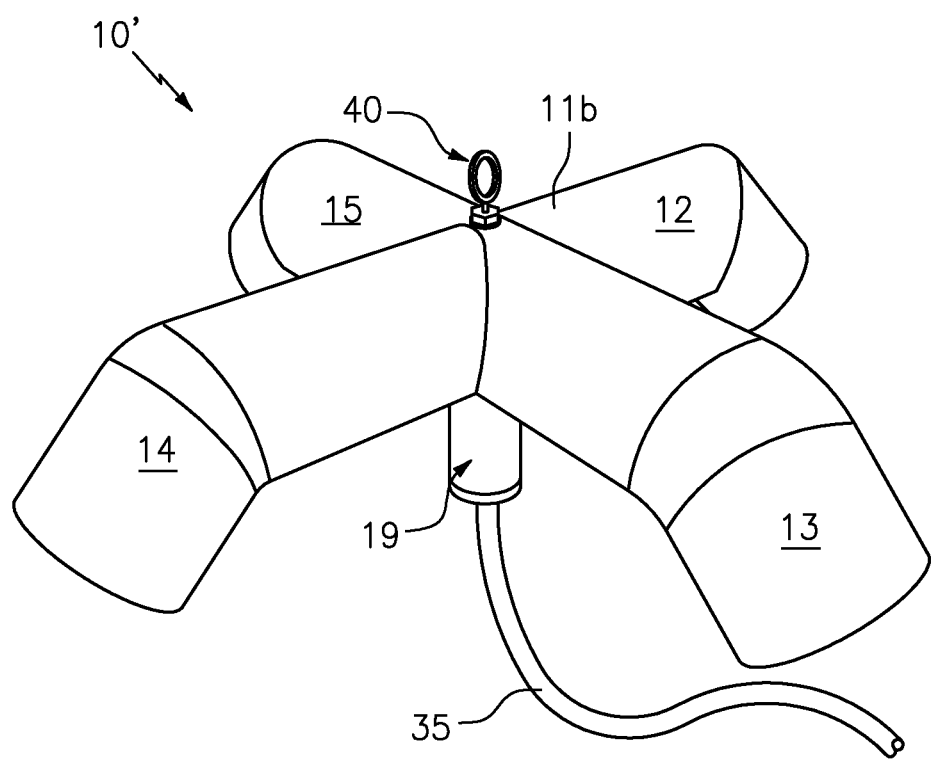
FIG. 4 is a bottom side view of the perspective view of the submersible shrimp light, in accordance with one embodiment of the invention.
Figure 5:
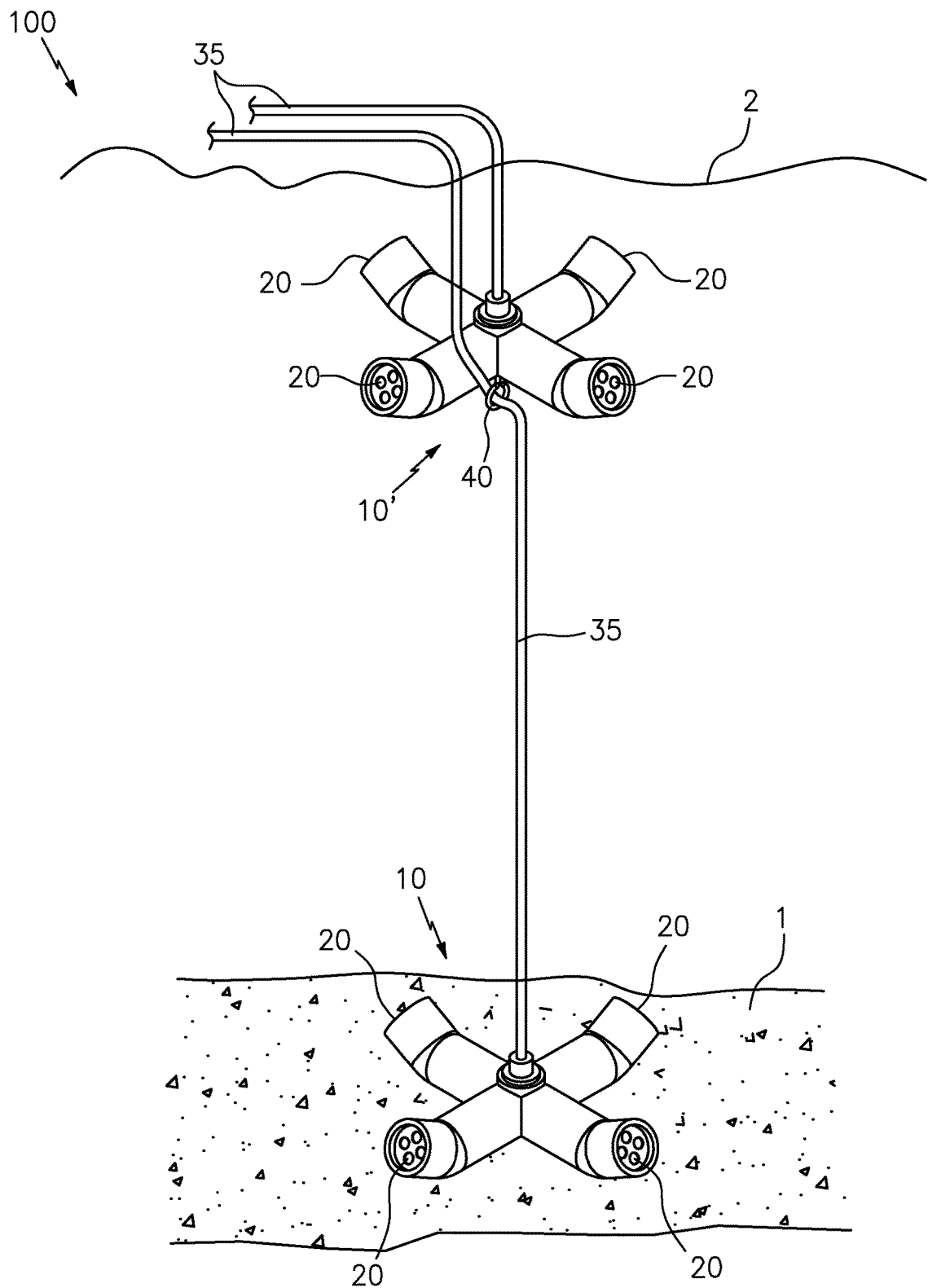
FIG. 5 is a perspective view of a submersible shrimp light system in operation, in accordance with another embodiment of the invention.

Referring now additionally to FIGS. 4 and 5, another embodiment of the submersible shrimp light 10' is now described. In this embodiment of the shrimp light 10' those elements discussed above with respect to FIGS. 1-3 are given the same numbers and most require no further discussion herein. This embodiment differs from the previous embodiment in that this shrimp light 10' does not include the weighted element 30 within the main body, or has a lesser amount of weight, and is designed to float at or just beneath (e.g., 1-3 feet) the surface of the water 2. As shown, the shrimp light 10' can include a hook 40, or other such coupling device that is positioned along the bottom surface of the central body 11b. The hook 40 can function to selectively couple any number of secondary objects such as an anchor weight (not shown), for example. With the floating action and the attached anchor weight, the shrimp light 10' may readily float and bob in the area adjacent to a boat or dock.

FIG. 5 illustrates one embodiment of a submersible shrimp light system 100, wherein both the shrimp light 10 and 10' are deployed simultaneously. As shown, the weighted shrimp light 10 can sink to the ocean floor 1 as described above, whereas the other shrimp light 10' can float above the same area. Such a feature providing a clear and bright area for catching shrimp everywhere from the surface of the water to the ocean floor.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the body sections 11-15, for example, may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A submersible lighting device, comprising:
 a unitary main body that includes a central main body section and four generally hollow elongated arms extending laterally outward therefrom to form a cross-shaped member;
 a plurality of lighting units that are disposed inside each of the hollow elongated arms along a distal end thereof, said lighting units being configured to collectively illuminate a 360 degree area about the central main body section; and
 an elongated waterproof electrical power tether, said tether being coupled to the central main body section, and being communicatively linked to each of the plurality of lighting units.

2. The device of claim 1, wherein each of the four arms includes a bend that orients the distal end at a first angle with respect to a proximal end.

3. The device of claim 2, wherein the bend is approximately 45 degrees.

4. The device of claim 2, wherein each arm includes a bend at an identical angle.

5. The device of claim 2, wherein at least one arm includes a bend having an angle that is different from the bend of another arm.

6. The device of claim 1, wherein each of the lighting units comprises:
 a plurality of light emitting diodes;
 a base material for supporting the plurality of light emitting diodes;
 a clear lens that is in communication with the distal end of the arm to which the lighting unit is secured, said lens being configured to prevent water from contacting the plurality of light emitting diodes; and
 one or more power lines that are in communication with the elongated waterproof electrical power tether.

7. The device of claim 6, wherein each of the light emitting diodes are arranged in a generally circular pattern.

8. The device of claim 6, wherein each of the light emitting diodes are configured to produce at least one of green and white light, and at 100 lumens.

9. The device of claim 1, wherein said elongated waterproof electrical power tether includes a length of approximately 25 feet, and further includes an electrical connector along one end, said connector being configured to engage a power source.

10. The device of claim 1, wherein the elongated waterproof electrical power tether is connected to the central main body section via a connector.

11. The device of claim 1, further comprising:
 a buoyant donut that is disposed along an upper surface of the main body, said donut functioning to maintain the main body in an upright orientation when submerged.

12. The device of claim 11, further comprising:
 a weighted element that is disposed along a bottom portion of the main body,
 said weighted element being configured to maintain the device in a stationary position on an ocean floor.

13. The device of claim 11, further comprising:
 a hook that is disposed along a bottom surface of the central main body section, said hook being configured to selectively engage a secondary object.

14. A submersible lighting device, consisting of:
 a unitary main body that includes a central main body section and four generally hollow elongated arms extending laterally outward therefrom to form a cross-shaped member;
 a plurality of lighting units that are disposed inside each of the hollow elongated arms along a distal end thereof, said lighting units being configured to collectively illuminate a 360 degree area about the central main body section; and an elongated waterproof electrical power tether, said tether being coupled to the central main body section, and being communicatively linked to each of the plurality of lighting units.

\* \* \* \* \*